United States Patent Office 3,305,528
Patented Feb. 21, 1967

3,305,528
POLY(HYDROXYETHERS) AND A METHOD
FOR THEIR PREPARATION
John Wynstra, Berkeley Heights, Norman H. Reinking, Millington, and Austin E. Barnabeo, Plainfield, N.J., assignors to Union Carbide Corporation, a corporation of New York
No Drawing. Filed Nov. 30, 1960, Ser. No. 72,567
15 Claims. (Cl. 260—47)

This invention relates to thermoplastic poly(hydroxyethers) and to a method for their preparation by the reaction of a dihydric polynuclear phenol with an epihalohydrin. More particularly, this invention relates to relatively high molecular weight, thermoplastic poly(hydroxyethers) which are substantially linear, and gel-free, and are characterized by excellent heat stability and toughness and find wide utility in the production of molded articles and in the preparation of film material which have excellent mechanical properties.

Various methods have been reported in the literature for the preparation of resins by reacting a dihydric polynuclear phenol with an epihalohydrin. For example, 2,2-bis-(p-hydroxyphenyl)-propane has been reacted with epichlorohydrin, in an alkaline medium, to produce a resin whose structure has been represented by the formula:

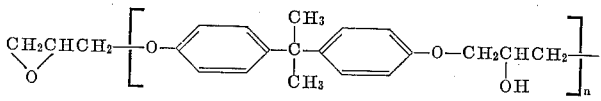

wherein $n$ is an integer having a value of 0 to about 20.

In the series of commercially available resins whose structure is represented by the formula noted in the proceding paragraph, the highest molecular weight resin is one wherein $n$, as stated, has a value of about 20. These resins, however, suffer the deficiency of being brittle and friable and of not possessing adequate toughness for use in typical plastics applications unless reacted with other materials and converted to a thermoset state. Consequently, such resins have found practically no utility in molding applications and in the formation of thin self-sustaining film material.

Somewhat higher molecular weight resins, obtained by reacting a dihydric polynuclear phenol with epichlorohydrin, have been apparently disclosed by Carpenter et al. in their United States Patent 2,602,075 issued July 1, 1952. These resins, although somewhat higher in molecular weight than the commercially available, thermosetting brittle resins, referred to by formula in the preceding paragraph, are still characterized by undesirable properties such as low extensibility, low reduced viscosity, and lack of toughness, as indicated by low impact strength. In addition, the resins disclosed by Carpenter et al. contain undesirable gel, which is an insoluble, infusible product. As a result, film produced from these resins contain visible gel specks, commonly referred to as fish eyes, which mar the appearance of the film and destroy its scope of usefulness in many diverse applications, as for example, as packaging for cosmetics.

The poly(hydroxyethers) of the present invention, in contra-distinction to the commercially available brittle, friable, thermosetting resins and the resins disclosed by Carpenter et al., are substantially linear, gel-free thermoplastic polymers which have excellent mechanical properties and find wide utility in the production of shaped articles, such as film material. Film material, prepared from poly(hydroxyethers) of the present invention, contain virtually no gel-specks and are especially useful in the packaging industry as wrapping material for cosmetics and various other such articles. Furthermore, the thermoplastic poly(hydroxyethers) of the present invention retain their excellent mechanical properties on aging.

The substantially linear, gel-free thermoplastic poly(hydroxyethers) of the present invention are the condensation reaction products of a dihydric polynuclear phenol and an epihalohydrin and contain as the recurring units a residue of a dihydric polynuclear phenol having the general formula —O—E—O— wherein E is the nucleus of the dihydric polynuclear phenol in which the hydroxyl groups are attached to different nuclei, or alternatively stated —O—E—O— is the residue obtained by removing the hydroxyl hydrogen atoms of the dihydric polynuclear phenol and a group having the general formula:

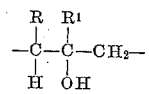

wherein R and $R^1$ which can be the same or different are hydrogen or methyl, with the recurring units having the general formula:

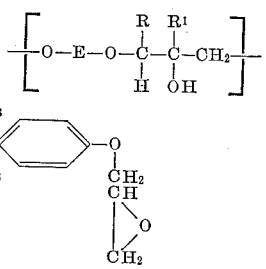

E, R and $R^1$ being as previously defined.

The poly(hydroxyethers) of this invention have reduced viscosities of at least about 0.43, generally from about 0.43 to about 1 and preferably from about 0.5 to about 0.7; a melt index at 220° C. of less than about 5 decigrams per minute under a pressure of 44 p.s.i., preferably from about 0.1 to about 4 decigrams per minute; a stability index of less than about a plus or minus 20 percent change, preferably less than about a plus or minus 10 percent change; and a tensile impact strength of greater than about 75 ft. lbs./inch³.

Reduced viscosity was determined by weighing a 0.2 gram sample of poly(hydroxyether) into a 100 ml. volumetric flask and adding a solvent thereto. After solution was complete, additional solvent was added to exactly the 100 ml. mark while the flask was maintained in a 25° C. constant temperature bath. The solution was thereafter filtered through a sintered glass funnel and the viscosity of a 3 ml. sample determined in an Ostwalt viscometer at 25° C. Reduced viscosity values were computed by use of the equation:

$$RV = \frac{t_s - t_o}{ct_o}$$

wherein:
$t_o$ is the efflux time for the solvent
$t_s$ is the efflux time for the poly(hydroxyether) solution
$c$ is the concentration of the poly(hydroxyether) solution in terms of grams of poly(hydroxyether) per 100 ml. of solution.

The solvent used was tetrahydrofuran.

Melt index (MI) was determined by weighing in grams the amount of poly(hydroxyether), which was at a temperature of 220° C. and under a pressure of 44 p.s.i., that flowed through an orifice having a diameter of 0.0825 inch and a length of 0.315 inch over a 10-minute period. Four such determinations were made and the average value of the 4 determinations was reported as decigrams per minute under a pressure of 44 p.s.i. at 220° C.

Stability index was determined using the equation:

$$S = \frac{MI_2 - MI_1}{MI_1} \cdot 100$$

wherein $MI_1$ is the melt index of the poly(hydroxyether) determined as described in the preceding paragraph and $MI_2$ is the melt index determined as described in the preceding paragraph with the exception that each sample of poly(hydroxyether) tested was heated at 250° C. for 20 minutes prior to being tested at 220° C.

Tensile impact strength was determined as follows: film specimens 1.5 inches long and 0.125 inch wide were cut from a film having a thickness of about 0.01 inch, prepared as described in Example 1 of this specification. The impact tester used was identical to that described in ASTM test D–256–56 with the following exceptions: The pendulum actually used was a steel pendulum, cylindrical in shape with a diameter of 0.85 inch and weighing 1.562 lbs. The striking piece of the pendulum, mounted almost at the top of the pendulum was a cylinder 0.3 inch in diameter. Each film specimen was clamped between jaws of the tester, which were spaced 1 inch apart, with the 0.125 inch width mounted vertically. The pendulum was raised to a constant height to deliver 1.13 ft.-lbs. at the specimen. When the pendulum was released, the cylindrical striking piece hit the specimen with its flat end, broke the specimen, and travelled to a measured height beyond. The difference between the height travelled by the pendulum with no film in its path minus the height to which it travelled with the film in its path was converted to energy in foot-pounds. On dividing this value by the volume of that portion of the sample located between the jaws of the tester, the tensile impact strength in foot-pounds per cubic inch was obtained. Each test result reported is the average value obtained using 5 specimens as described. Each test was conducted in an atmosphere which was at 25° C. and at 40 percent relative humidity.

Illustrative of dihydric polynuclear phenols which can be reacted with epihalohydrins to produce the thermoplastic poly(hydroxyethers) of the present invention are the dihydric polynuclear phenols having the general formula:

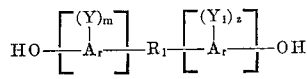

wherein: $A_r$ is an aromatic divalent hydrocarbon radial such as naphthylene and phenylene with phenylene being preferred for purposes of this invention; Y and $Y_1$, which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butoxy, amyloxy and the like, preferably an alkoxy radical having a maximum of 4 carbon atoms. It is to be understood that whenever there are substituents exclusive of the hydroxyl groups on either or both of the aromatic divalent hydrocarbon groups, that these substituents can be the same or different; $m$ and $z$ are integers having a value of from 0 to a maximum value corresponding to the number of hydrogen atoms on the aromatic ring ($A_r$) which can be replaced by substituents and can have the same or different values; and $R_1$ is a divalent radical, as for example—

or —O—, or —S—, or —SO—, or —$SO_2$—, or —S—S—, or a divalent hydrocarbon radical, as for example, an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alkylene or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy pentamethylene, 1,4 - (2 - methoxycyclohexane), phenoxy ethylene, 2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene) 1,4-(2-ethoxyphenylene), 1,4-(2-n-propoxyphenylene), 1,4-(2-phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like; or $R_1$ can be a ring which is fused to one of the $A_r$ groups as is the case, for example, in the compound having the formula:

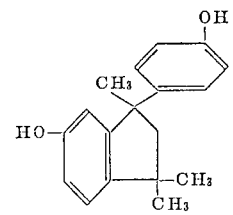

or $R_1$ can be a polyalkoxy radical such as polyethoxy, polypropoxy, polythioethoxy, polybutoxy, polyphenylethoxy; or $R_1$ can be a radical containing a silicon atom as, for example, polydimethylsiloxy, polydiphenylsiloxy, polymethylphenylsiloxy and the like; or $R_1$ can be two or more alkylene or alkylidene radicals separated by an aromatic ring, a tertiary amino group, an ether linkage, a carbonyl group or separated by a linkage containing sulfur such as sulfur, sulfoxide and the like.

Particularly preferred are the dihydric polynuclear phenols having the general formula:

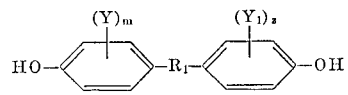

wherein Y, $Y_1$, are as previously defined, $m$ and $z$ have values of from 0 to 4 inclusive and $R_1$ is an alkylene or alkylidene group, preferably having from 1 to 3 carbon atoms inclusive or $R_1$ is a saturated group having the formula:

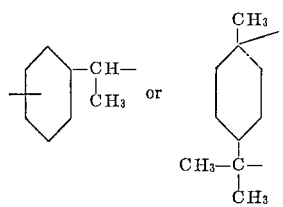

Poly(hydroxyethers) produced using the dihydric polynuclear phenols described in the preceding paragraph have extremely good mechanical properties. In addition poly(hydroxyethers) produced using a dihydric polynuclear phenol wherein $R_1$ is a saturated group having the formula:

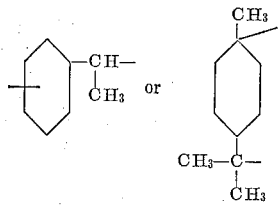

have heat distortion temperatures which are relatively high.

Exemplary of other specific dihydric phenols include among others the bis-(hydroxyphenyl)-alkanes such as 2,2-bis-(p-hydroxyphenyl)-propane, commonly referred to as bisphenol-A, 2,4'-dihydroxy diphenylmethane,
bis-(2-hydroxyphenyl)-methane,
bis-(4-hydroxyphenyl)-methane,
bis-(4-hydroxy-2,6-dimethyl-3-methoxyphenyl)-methane,
1,1-bis-(4-hydroxyphenyl)ethane,
1,2-bis-(4-hydroxyphenyl)-ethane,
1,1-bis-(4-hydroxy-2-chlorophenyl)-ethane,
1,1-bis-(3,5-dimethyl-4-hydroxyphenyl)-ethane,
1,3-bis-(3-methyl-4-hydroxyphenyl)-propane,
2,2-bis-(3-phenyl-4-hydroxyphenyl)-propane,
2,2-bis-(3-isopropyl-4-hydroxyphenyl)-propane,
2,2-bis-(2-isopropyl-4-hydroxyphenyl)-propane,
2,2-bis-(4-hydroxynaphthyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1,2-bis-(phenyl)-propane,
2,2-bis-(4-hydroxyphenyl)-1-phenylpropane and the like;
dihydroxy biphenyls such as 4,4'-dihydroxybiphenyl,
2,2'-dihydroxybiphenyl,
2,4'-dihydroxybiphenyl and the like;
di(hydroxyphenyl)sulfones such as bis(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone,
3'-chloro-4,4'-dihydroxy diphenyl sulfone and the like;
di(hydroxyphenyl) ethers such as bis-(4-hydroxyphenyl)-ether,
the 4,3'-, 4,2'-, 2,2'-, 2,3'-, dihydroxy-diphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxybiphenyl)-ether,
4,4'-dihydroxy-2,6-dimethoxy-diphenyl ether,
4,4'-dihydroxy-2,5-diethoxydiphenyl ether, and the like;
also suitable are 1,1-bis-(4-hydroxyphenyl)-2-phenylethane,
1,3,3-trimethyl-1-(4-hydroxyphenyl)-6-hydroxyindane,
2,4-bis-(p-hydroxyphenyl)-4-methylpentane and the like.

Mixtures of dihydric polynuclear phenols can also be employed and wherever the term dihydric polynuclear phenol is used herein, mixtures of these compounds are intended to be included.

For purposes of this invention, the dihydric polynuclear phenols which are used are substantially free of higher functional phenolic compounds, that is phenols containing three or more phenolic hydroxyl groups, such as trihydric phenols or trisphenols. In general, the dihydric polynuclear phenols used should contain less than about 1.5 moles percent and preferably less than about 0.5 mole percent, based on the moles of dihydric polynuclear phenols, of such higher functional phenols. A dihydric polynuclear phenol, containing more than about 1.5 moles percent of higher functional phenolic compounds, when reacted with an epihalohydrin according to the present invention, tends to form a gel. The formation of a gel when using a dihydric polynuclear phenol containing more than about 1.5 moles percent of higher functional phenolic compounds is indicated by data which follows. Five poly(hydroxyethers) were prepared in a manner identical to that described in Example 5 of this specification with the exception that in each case part of the 2,2-bis-(p-hydroxyphenyl)propane was replaced by the trisphenol, 2,4-bis-(α,α-dimethyl-4-hydroxybenzyl)-phenol. The mole percent of the trisphenol used is noted in Table 1 which follows, along with reduced viscosity measurements of the poly(hydroxyethers) produced.

TABLE I

| Poly(hydroxyether) | Mole (Percent) Trisphenol | Reduced Viscosity |
|---|---|---|
| 1 | 0.25 | 0.61 |
| 2 | 0.5 | 0.62 |
| 3 | 1.0 | 0.65 |
| 4 | 1.5 | 0.94 |
| 5 | 2.5 | (*) |

*Product gelled no viscosity determination possible.

The 2,2-bis-(p-hydroxyphenyl)-propane used in determining the data noted in Table 1 contained, in addition to the trisphenol, the following impurities wherein the weight percentages are based on 2,2-bis-(p-hydroxyphenyl)propane:

Percent by weight
2,2-(2-hydroxy-4'-hydroxydiphenyl)-propane _____ 0.4
Phenol _____ 0.1
Dianins compound _____ 0.2

The concentration of the higher functional phenolic compounds in the dihydric polynuclear phenols can be readily measured by conventional chromatographic techniques such as described by W. M. Anderson, G. B. Carter and A. J. Landua in Analytical Chemistry 31, 1214 (1959) and if necessary, the dihydric polynuclear phenol can be purified by recrystallization from a suitable solvent such as toluene.

More than about 1.5 moles percent of a higher functional phenolic compound can be tolerated in the dihydric polynuclear phenols provided that an equivalent amount of a monohydric phenol is added in order to offset the increased functionality of the resultant system.

If desired, monohydric phenols can be added to the reaction mixture containing the dihydric polynuclear phenol and the epihalohydrin at the start of the reaction or at any other convenient time during the course of the reaction. The monohydric phenols serve to regulate the molecular weight of the poly(hydroxyether) by acting as a chain terminator. When used as chain terminators, the monohydric phenols are used in amounts of from about 0.01 mole to about 0.05 mole, preferably about 0.01 mole to about 0.02 mole per mole of the dihydric polynuclear phenol. This amount is in addition to the amount of monohydric phenol used for purposes of offsetting the presence of higher functional phenolic compounds as explained in the preceding paragraph. Illustrative of suitable monohydric phenols are the following: phenol, alkylated monohydric phenols such as m-cresol, ethylphenol, p-tertiary butylphenol and the like; alkoxy monohydric phenols such as m-methoxyphenol, m-ethoxphenol and the like; halogenated monohydric phenols such as m-chlorophenol, m-bromophenol and the like, and p-phenyl phenol and the like.

Among suitable epihalohydrins and mixtures thereof which can be reacted with dihydric polynuclear phenols to produce the thermoplastic poly(hydroxyethers) of this invention are those having the general formula:

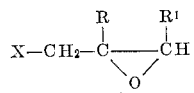

wherein R and R[1] which can be the same or different are hydrogen or methyl and X is a halogen atom, i.e., chlorine, bromine, and the like. Specific epihalohydrins are epichlorohydrin, epibromohydrin, 1,2-epoxy-1-methyl-3-chloropropane and 1,2-epoxy-2-methyl-3-chloropropane.

In its broadest aspect, the process by which the substantially linear, gel-free thermoplastic poly(hydroxyethers) of the present invention are prepared is conducted by admixing a dihydric polynuclear phenol, from about 0.985 to about 1.015 moles of an epihalohydrin, preferably 0.985 mole, per mole of dihydric polynuclear phenol, together with from about 0.6 to about 1.5 moles, preferably about 1.25 moles, per mole of dihydric polynuclear phenol, of an alkali metal hydroxide such as sodium hydroxide, potassium hydroxide and the like, generally in an aqueous medium at a temperature of about 10° C. to about 50° C. preferably about 20° C. to about 40° C. until at least about 60 mole percent of the epihalohydrin has been consumed (conveniently determined by titrating an aliquot part of the mixture with 0.1 N HCl in order to determine the amount of unreacted alkali metal hydroxide, the amount of base consumed corresponding to the amount of reacted epihalohydrin) adjusting, if necessary, the amount of alkali metal hydroxide in the reaction mixture so that the final concentration of alkali in the aqueous phase of the reacted mixture, i.e., at the completion of the reaction, is at least about 0.1 molal preferably from about 0.3 to about 0.6 molal and heating the reaction mixture at a temperature of from about 60° C. to boiling or reflux until the poly(hydroxyether) produced has a reduced viscosity of at least 0.43. Amounts of alkali metal hydroxide used can be such that the molal concentration is greater than 0.6 if so desired, but this is economically unattractive.

The amount of water forming part of the initial charge can vary over wide limits, from an amount sufficient to serve as a vehicle for introducing the alkali metal hydroxide into the reaction mixture to as much as about 500 percent by weight based on the weight of dihydric polynuclear phenol which forms part of the initial reaction mixture.

As previously stated the amount of epihalohydrin used can vary from about 0.985 to about 1.015 moles per mole of dihydric polynuclear phenol. The desirability of employing the epihalohydrin in the amounts noted is apparent from the data of Table II which was obtained by preparing a number of poly(hydroxyethers) by the process described in Example 3 of this specification and determining the properties of the poly(hydroxyethers) produced. The mole ratio of epichlorohydrin to 2,2-bis-(p-hydroxyphenyl)propane is also noted in Table II. 2,2-bis-(p-hydroxyphenyl)propane is listed in Table II as bisphenol.

TABLE II

| Poly(hydroxyether) | Mole Ratio Bisphenol To Epichlorohydrin | Reduced Viscosity | Tensile Impact Strength | Tensile Elongation (Percent) |
|---|---|---|---|---|
| 6 | 1 to 0.95 | 0.30 | 10 | 5 |
| 7 | 1 to 0.985 | 0.46 | 80 | 60 |
| 8 | 1 to 0.99 | 0.51 | 102 | 62 |
| 9 | 1 to 1.015 | 0.45 | 75 | 58 |
| 10 | 1 to 1.05 | 0.30 | 10 | 5 |

In order to further demonstrate the necessity of conducting the process of the present invention at the temperatures set forth, reference is now made to Example 23 of this specification wherein there is described: the preparation of a poly(hydroxyether) referred to as poly(hydroxyether)-A in accordance with the present invention wherein the reaction mixture was initially heated at a temperature of about 30° C. until at least about 60 percent of the epihalohydrin had been consumed and then the reaction mixture was heated at a temperature of from about 60° C. to reflux; and the preparation of a poly(hydroxyether), referred to as Control 1, wherein the entire reaction was conducted at reflux. The data of Example 23 conclusively shows that the product of the present invention has vastly superior properties.

It is also preferred to conduct the reaction between the dihydric polynuclear phenol and the epihalohydrin, while the reactants are in the presence of, that is, in contact with, an inert, organic diluent, preferably a hydroxylated organic diluent, which is a solvent for the starting materials and is non-reactive with respect to the final product. Using an organic diluent facilitates agitation of the reaction mixture and facilitates recovery of the poly(hydroxyether). The actual organic diluent used will depend upon the starting materials and the temperature at which the reaction is to be conducted. It is customary to use the organic diluent in amounts of at least about 50 percent by weight based on the weight of the dihydric polynuclear phenol. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500 percent by weight based on the weight of the dihydric polynuclear phenol.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as anisole and the like; aliphatic hydrocarbons, such as n-hexane, n-heptane, and the like; halogenated aliphatic hydrocarbons, such as dichloromethane, 1,2-dichloroethane, and the like; ethers, such as diethyl ether, and the like; aliphatic ketones, such as acetone, methyl ethyl ketone, diethyl ketone and the like.

Particularly desirable organic diluents, as stated, are the hydroxylated organic diluents such as the aliphatic alcohols having the general formula $R^3OH$ wherein $R^3$ is an alkyl group, preferably containing from 1 to 10 carbon atoms inclusive. Specific compounds include among others methanol, ethanol, n-butanol, pentanol-3, n-hexanol and the like. Other hydroxylated organic diluents are ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, and the like as well as aromatic alcohols such as benzyl alcohol and the like.

It is to be understood that mixtures of organic diluents can be used if so desired. The organic diluent can form part of the initial reaction mixture or can be added to the reaction mixture at convenient times during the course of the reaction.

Once a poly(hydroxyether) is produced which has a reduced viscosity of at least about 0.43, it is customary to insure that the poly(hydroxyether) is free of epoxy groups, i.e.,

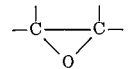

by adding to an organic solution of the poly(hydroxyether), a small amount of a monofunctional compound which will destroy epoxy groups and heating the mixture for about 1 to 2 hours at reflux. Illustrative of such compounds are monohydric phenols such as previously noted in this specification, as well as such monohydric phenols as p-hydroxybiphenyl, o-hydroxybiphenyl, o-cyclophenyl-phenol, p-cyclohexylphenol and the like; mineral acids such as hydrochloric acid, phosphoric acid and the like; monocarboxylic acids such as those having the formula $R^4COOH$ wherein $R^4$ is a saturated hydrocarbon group, preferably containing from 1 to 4 carbon atoms such as acetic acid, propionic acid, butyric acid and the like; aromatic acids such as benzoic acid and the like; secondary amines such as dimethylamine, diethyl amine, di-n-propylamine, diethanolamine, and the like; mercaptans such as those having the general formula $R^5SH$ wherein $R^5$ is a saturated hydrocarbon group, preferably containing 1 to 4 carbon atoms inclusive such as ethyl mercaptan and the like.

As a rule heating an organic solution of the poly(hydroxyether) in contact with from about 0.1 mole to about 0.5 mole of a monofunctional compound, per mole of dihydric polynuclear phenol forming part of the initial reaction mixtures, is sufficient to insure that all epoxy groups have been destroyed. More than about 0.5 mole of the monofuctional compound per mole of the dihydric polynuclear phenol can be used if so desired.

Recovery of the poly(hydroxyether), generally from an organic solution and/or from an aqueous medium can be accomplished by a variety of convenient methods. For example, the aqueous layer which may be present can be removed by decantation from the organic solution. The organic solution, containing the poly(hydroxyether), can then be water washed in order to insure that any residual alkali metal hydroxide and alkali metal hydroxide salt is removed from the poly(hydroxyether) solution. An acid such as HCl, $H_3PO_4$, or acetic acid can then be added to the poly(hydroxyether) solution in order to convert any alkali metal hydroxide which may still be entrained to the corresponding salt which can be easily removed by a water wash. Any excess acid will also be removed by water washing. The thermoplastic poly(hydroxyether) can then be recovered by stripping off the solvent, as for example, by the use of a heated, two-roll mill or by coagulating the poly(hydroxyether) in a non-solvent such as isopropanol or a mixture of isopropanol and water and recovering the poly(hydroxyether) as a filter cake, generally a white powdery solid.

The condensation reaction is conducted, generally under atmospheric pressure although, if desired, the reaction can be conducted under sub-atmospheric or super-atmospheric pressure. Also, the condensation reaction can be conducted under the atmosphere of an inert gas such as nitrogen.

In the following examples which are illustrative and not intended to limit the scope of this invention in any manner, 2,2-bis-(p-hydroxyphenyl)-propane contained the following impurities, wherein the mole percent of each impurity is based on the number of moles of 2,2-bis-(p-hydroxyphenyl)-propane.

| Impurity: | Mole percent |
|---|---|
| 2,4 - bis($\alpha,\alpha$ - dimethyl-4-hydroxybenzyl)-phenol | 0.16 |
| 2,2-(2-hydroxy-4'-hydroxydiphenyl)-propane | 0.4 |
| Phenol | 0.24 |
| Dianin's compound | 0.16 |

All other dihydric polynuclear phenols noted in the examples of this specification were substantially pure as determined by chromatographic analysis.

Tests referred to in this application and not described in detail have the following designations:

| Tests: | Designation |
|---|---|
| Heat distortion temperature (molded samples) | ASTM–D648–45T |
| Tensile strength (molded samples) | ASTM–D638–52T |
| Tensile modulus (molded samples) | ASTM–D638–52T |
| Tensile elongation (molded samples) | ASTM–D638–52T |
| Izod impact strength (molded samples) | WC–69–A/2 [1] |
| Tensile strength (film) | ASTM–D882–54T |
| Tensile modulus (film) | ASTM–D882–54T |
| Tensile elongation (film) | ASTM–D882–54T |

[1] This test is described in detail in a pamphlet published September 11, 1957, by Union Carbide Plastics Co., a division of Union Carbide Corporation, the pamphlet being identified by the designation WC–69–A/2.

Glass transition temperatures, commonly referred to as second order phase transition temperatures, refer to the inflection temperatures found by plotting the resilience (recovery from 1 percent elongation) of a film ranging in thickness from 3–15 mils against the temperature. A detailed explanation for determining resilience and inflection temperatures is to be found in an article by Alexander Brown in "Textile Research Journal," volume 25, 1955, at page 891.

Molal concentrations noted in this specification and claims refer to molal concentration of the alkali metal hydroxide in the aqueous layer of the reacted mixture, i.e., concentration of alkali metal hydroxide in the aqueous layer at the completion of the reaction, the completion of the reaction being that point when the poly(hydroxyether) produced has a reduced viscosity of at least 0.43.

Example 1

Into a 2-liter, three-necked Morton flask, equipped with a sealed stirrer, thermometer, and reflux condenser, there was placed:

| | Amount, grams |
|---|---|
| 2,2-bis-(p-hydroxyphenyl)-propane (1 mole) | 228.3 |
| Epichlorohydrin (1 mole) | 92.5 |
| Ethyl alcohol | 256.0 |
| Sodium hydroxide (1 mole) | 40.0 |
| Water | 160.0 | and the stirrer started. The reaction mixture was stirred for sixteen hours at room temperature (about 25° C.). At the end of 16 hours an additional 6 grams (0.15 mole) of sodium hydroxide, in 24 grams of water, were added to the contents of the flask and the reaction mixture heated to reflux about 80° C. Monochlorobenzene was then added into the flask according to the following schedule:

After 30 minutes at reflux, 60 ml. of monochlorobenzene added; after 45 minutes at reflux, 30 ml. of monochlorobenzene added, and after 60 minutes at reflux, 30 ml. of monochlorobenzene added.

The resultant mixture was heated at reflux for an additional 4 hours. At the end of this period, 9.4 grams (0.1 mole) of phenol and 60 ml. of monochlorobenzene were added into the flask and refluxing was continued for another two hours. Heating of the flask was then discontinued, the sealed stirrer stopped and the aqueous layer in the flask recovered by decantation.

The caustic concentration of the aqueous layer was 0.3 molal in sodium hydroxide, as determined by a standard 0.1 N HCl titration.

The monochlorobenzene - poly(hydroxyether) mass, which remained in the flask, was washed 3 times with 400 ml. portions of water and the water removed after each washing by decantation. 400 grams of chloroform were then added into the flask with the result that the poly(hydroxyether) dissolved in the chloroform. This solution was then acidified at room temperature (about 25° C.) by the addition thereto, with vigorous stirring of a solution of 20 ml. of phosphoric acid (87%) in 400 ml. of water. The contents of the flask were washed 8 times using 400 ml. portions of water, the water being removed after each washing by decantation, and then were poured into a Waring Blendor which contained 2 liters of isopropanol. The poly(hydroxyether) which precipitated and coagulated was recovered as a filter cake and dried by heating in a vacuum oven (30 inches of Hg vacuum) for 48 hours at 65° C. Properties of the poly(hydroxyether) are noted below:

Reduced viscosity=0.64.
Melt index=0.3.
Stability index=0.
Nature of the poly(hydroxyether)=white, powdery amorphous, solid.

Film was then formed by compressing 10-gram samples of the poly(hydroxyether) to a thickness of 2 mils at 160° C.

Properties (film).
Tensile strength (p.s.i.)=9200.
Tensile modulus (p.s.i.)=280,000.
Tensile elongation (%)=62.
Tensile impact (ft.-lbs./inch$^3$)=150.

Amount of sodium hydroxide used in conducting this example was 1.15 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration in the aqueous layer was 0.3 molal.

*Example 2*

This example was conducted in a manner identical to that described in Example 1 with, however, the following exceptions:

(1) Amount of ethyl alcohol forming part of the initial charge in the Morton flask was 242.6 grams.

(2) Amount of sodium hydroxide and water forming part of the initial charge in the Morton flask was 40 grams NaOH in 93.3 grams of water.

(3) Amount of sodium hydroxide added to the contents of the Morton flask after the reaction mixture was allowed to stand, with stirring, for 16 hours at about 25° C., was 6 grams. The sodium hydroxide was added as a 5.5 percent aqueous solution, that is 6 grams of sodium hydroxide in 103.1 grams of water.

Properties of the poly(hydroxyether) produced:
Reduced viscosity=0.65.
Melt index=0.3.
Stability index=0.05.
Nature of the poly(hydroxyether)=white, powdery, solid.

Amount of sodium hydroxide used in conducting this example was 1.15 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.3 molal.

*Example 3*

Into a 2-liter, three necked Morton flask, equipped with a sealed stirrer, thermometer and reflux condenser there was placed:

| | Amount, grams |
|---|---|
| 2,2-bis-(p-hydroxyphenyl)-propane (1 mole) | 228.3 |
| Epichlorohydrin (1 mole) | 92.5 |
| Ethyl alcohol | 212.6 |
| Sodium hydroxide | 44.0 |
| Water | 139.3 | and the stirrer started. The reaction mixture was heated at 40° C. for 3 hours, allowed to stand for 16 hours at room temperature, about 25° C., and then heated at reflux, about 80° C. for 5 hours. Monochlorobenzene was then added according to the schedule described in Example 1. A procedure identical to that described in Example 1 was then used to obtain the poly(hydroxyether) starting with the addition to the reaction mixture of 9.4 grams (0.1 mole) of phenol and 60 ml. of monochlorobenzene. Properties of the poly(hydroxyether) produced:

Reduced viscosity=0.54.
Melt index=0.9.
Stability index=0.11.
Nature of the poly(hydroxyether)=white, powdery, amorphous solid.

Amount of sodium hydroxide used in conducting this example was 1.10 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.24 molal.

*Example 4*

This example was conducted in a manner identical to that described in Example 3 with the following exception:

(1) Toluene was used in place of monochlorobenzene.

Properties of the poly(hydroxyether) produced:
Reduced viscosity=0.55.
Melt index=1.6.
Stability=−0.11.
Nature of the poly(hydroxyether)=white, powdery, amorphous solid. Amount of sodium hydroxide used in conducting this example was 1.10 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.25 molal.

*Example 5*

This example was conducted in a manner identical to that described in Example 3 with the following exception:

(1) The materials forming the initial charge in the Morton flask were stirred at room temperature, about 25° C., for 16 hours, and then heated at reflux for 5 hours.

Properties of the poly(hydroxyether) produced:
Reduced viscosity=0.56.
Melt index=0.8.
Stability index=0.
Nature of the poly(hydroxyether)=white, powdery, amorphous, solid. Amount of sodium hydroxide used in conducting this example was 1.10 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.24 molal.

*Example 6*

This example was conducted in a manner identical to that described in Example 5 with, however, the following exceptions:

(1) Amount of epichlorohydrin forming part of the initial charge in the Morton flask was 0.985 mole per mole of 2,2-bis-(p-hydroxyphenyl)-propane.

(2) After refluxing for 5 hours and prior to being washed, no phenol or chlorobenzene were added into the flask.

Properties of the poly(hydroxyether) produced:
Reduced viscosity=0.45.
Melt index=3.0.
Stability index=0.03.
Nature of the poly(hydroxyether)=white, powdery, amorphous solid.

Amount of sodium hydroxide used in conducting this example was 1.1 moles per mole of 2,2-bis-(p-hydroxyphenyl)-propane; amount of epichlorohydrin used was 0.985 mole per mole of 2,2-bis-(p-hydroxyphenyl)-propane; sodium hydroxide concentration was 0.26 molal.

*Example 7*

This example was conducted in a manner identical to that of Example 5 with, however, the following exception:

(1) 1.015 moles of epichlorohydrin per mole of 2,2-bis-(p-hydroxyphenyl)-propane were used.

Properties of the poly(hydroxyether) produced:
Reduced viscosity=0.46.
Melt index=2.5.

Stability index=0.

Nature of the poly(hydroxyether)=white, powdery, amorphous solid.

Amount of sodium hydroxide used in conducting this example was 1.1 moles per mole of 2,2-bis-(p-hydroxyphenyl)-propane; amount of epichlorohydrin used was 1.015 moles per mole of 2,2-bis-(p-hydroxyphenyl)-propane; sodium hydroxide concentration was 0.24 molal.

*Example 8*

This example was conducted in a manner identical to that described in Example 3 with the following exceptions:

(1) Amount of water forming part of the initial charge in the Morton flask was 148.2 grams.

(2) Amount of sodium hydroxide forming part of the initial charge in the Morton flask was 46 grams.

Properties of the poly(hydroxyether) produced:
Reduced viscosity=0.64.
Melt index=1.8.
Stability index=0.
Nature of the poly(hydroxyether)=white, powdery, amorphous solid.

Amount of sodium hydroxide used in conducting this example was 1.15 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.34 molal.

*Example 9*

This example was conducted in a manner identical to that described in Example 3 with the following exceptions:

(1) The amount of water forming part of the initial charge in the Morton flask was 145 grams.

(2) The amount of sodium hydroxide forming part of the initial charge in the Morton flask was 45 grams.

Properties of the poly(hydroxyether) produced:
Reduced viscosity=0.56.
Melt index=0.7.
Stability index=0.07.
Nature of the poly(hydroxyether)=white, powdery, amorphous solid.

Amount of sodium hydroxide used in conducting this example was 1.125 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.3 molal.

*Example 10*

This example was conducted in a manner identical to that described in Example 5 with the following exception:

(1) Amount of ethyl alcohol forming part of the initial charge in the Morton flask was 140 grams.

Properties of the poly(hydroxyether) produced:
Reduced viscosity=0.51.
Melt index=2.0.
Stability index=0.05.
Nature of the poly(hydroxyether)=white, powdery, amorphous solid.

A film having a thickness of 2 mils was prepared from the poly(hydroxyether) by dissolving the poly(hydroxyether) in sufficient dioxane to produce an organic solution containing 20 percent by weight solids and casting the solution onto a clean glass plate using a Boston Bradley No. 1340 draw down blade. The coated glass plate was allowed to stand at room temperature, about 25° C. for 2 hours and then placed in a circulating air oven, which was at 70° C., for 6 hours. The glass plate was then cooled to room temperature and the film stripped therefrom.

Properties: (film).
Tensile strength (p.s.i.)=9250.
Tensile modulus (p.s.i.)=325,000.
Tensile elongation (%)=86.
Tensile impact (ft. lbs./inch³)=120.

Amount of sodium hydroxide used in conducting this example was 1.1 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.24 molal.

*Example 11*

This example was conducted in a manner identical to that described in Example 5 with the following exceptions:

(1) Amount of water forming part of the initial charge in the Morton flask was 148.2 grams.

(2) Amount of sodium hydroxide forming part of the initial charge in the Morton flask was 46 grams.

Properties of the poly(hydroxyether) produced:
Reduced viscosity=0.70.
Melt index=0.1.
Stability index=0.1.
Nature of the poly(hydroxyether)=white, powdery, amorphous solid.

A film pressed from the poly(hydroxyether), in a manner described in Example 1, had a tensile impact strength of 165 ft. lbs./inch³.

Amount of sodium hydroxide used in conducting this example was 1.15 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.3 molal.

*Example 12*

This example was conducted in a manner identical to that described in Example 1 with the following exceptions:

(1) Amount of ethyl alcohol forming part of the initial charge in the Morton flask was 228.3 grams.

(2) Amount of water forming part of the initial charge in the Morton flask was 76.1 grams.

(3) Amount of sodium hydroxide forming part of the initial charge in the Morton flask was 32.0 grams.

(4) After the reaction mixture was stirred for 16 hours at room temperature there was an addition into the Morton flask of 12 grams of sodium hydroxide in 36 grams of water.

Properties of the poly(hydroxyether) produced:
Reduced viscosity=0.45.
Melt index=3.8.
Stability index=0.05.
Nature of the poly(hydroxyether)=white, powdery, amorphous solid.

A film pressed from the poly(hydroxyether) in a manner described in Example 1, had a tensile impact strength of 80 ft.-lbs./inch³.

Amount of sodium hydroxide used in conducting this example was 1.1 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.24 molal.

*Example 13*

Into a 2-liter, three-necked Morton flask, equipped with a sealed stirrer, thermometer and reflux condenser, there was placed:

| | Amount, grams |
|---|---|
| 2,2-bis-(p-hydroxyphenyl)-propane (1 mole) | 228.3 |
| Epichlorohydrin (1 mole) | 92.5 |
| 2-ethoxyethanol | 276 |
| Sodium hydroxide | 46 |
| Water | 173 | and the stirrer started. The reaction mixture was stirred at room temperature, about 25° C., for 18 hours after which it was heated to a temperature of between 80° C.

and 85° C. Monochlorobenzene was then added according to the following schedule:

After 75 minutes at 80° C., 30 ml. of monochlorobenzene added,

After 90 minutes at 80° C., 30 ml. of monochlorobenzene added,

After 120 minutes at 80° C., 40 ml. of monochlorobenzene added.

The resultant mixture was heated at between 80° C. and 85° C. an additional 3 hours. The poly(hydroxyether) was then obtained using the procedure described in Example 1 starting with the addition to the reaction mixture of 9.4 grams (0.1 mole) of phenol and 60 ml. of monochlorobenzene.

Properties of the poly(hydroxyether) produced:
Reduced viscosity=0.46.
Melt index=2.3.
Stability index=0.02.
Nature of the poly(hydroxyether)=white, powdery, amorphous solid.

Amount of sodium hydroxide used in conducting this example was 1.15 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration in the aqueous layer was 0.29 molal.

*Example 14*

This example was conducted in a manner identical to that of Example 3 with the following exceptions:

(1) The amount of ethyl alcohol forming part of the initial charge in the Morton flask was 684.9 grams.

(2) Amount of water forming part of the initial charge in the Morton flask was 366.7 grams.

(3) Amount of sodium hydroxide forming part of the initial charge in the Morton flask was 50 grams.

(4) Materials forming the initial charge were stirred for 16 hours at room temperature, about 25° C., and then heated at reflux for 4 hours.

Properties of the poly(hydroxyether) produced:
Reduced viscosity=0.7.
Melt index=0.1.
Stability index=0.
Nature of the poly(hydroxyether)=white, powdery, amorphous solid.

Amount of sodium hydroxide used in conducting this example was 1.25 moles per mole of 2,2-bis-(p-hydroxyphenyl)-propane, amount of epichlorohydrin used was 1 mole per mole of 2,2-bis-(p-hydroxyphenyl)-propane; sodium hydroxide concentration was 0.22 molal.

*Example 15*

This example was conducted in a manner identical with that described in Example 14 with the following exceptions:

(1) Amount of NaOH forming part of the initial charge in the Morton flask was 54 grams.

(2) Amount of water forming part of the initial charge in the Morton flask was 486 grams.

Properties of the poly(hydroxyether) produced:
Reduced viscosity=0.63.
Melt index=0.35.
Stability index=0.15.
Natural of the poly(hydroxyether)=white, powdery, amorphous solid.

Amount of sodium hydroxide used in conducting this example was 1.35 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.28 molal.

*Example 16*

This example was conducted in a manner identical to that of Example 1 with the following exceptions:

(1) Amount of ethyl alcohol forming part of the initial charge in the Morton flask was 212.6 grams.

(2) Amount of water forming part of the initial charge in the Morton flask was 126.7 grams.

(3) Amount of sodium hydroxide forming part of the initial charge in the Morton flask was 40 grams.

(4) There was an addition into the Morton flask of 4 grams of sodium hydroxide in 4 grams of water after the reactor mixture was stirred for 16 hours at room temperature.

Properties of the poly(hydroxyether) produced:
Reduced viscosity=0.52.
Melt index=1.9.
Stability index=−0.05.
Nature of the poly(hydroxyether)=white, powdery, amorphous, solid.

Amount of sodium hydroxide used in conducting this example was 1.1 moles per mole of 2,2-bis-(p-hydroxyphenyl)-propane; amount of epichlorohydrin used was 1 mole per mole of 2,2-bis-(p-hydroxyphenyl)-propane; sodium hydroxide concentration was 0.24 molal.

*Example 17*

Into a one-liter, three-necked Morton flask equipped with a sealed stirrer, thermometer, and reflux condenser there was placed:

| | Amount, grams |
|---|---|
| 4,4'-dihydroxydiphenylsulfone (0.5 mole) | 125.1 |
| Epichlorohydrin (0.5 mole) | 46.3 |
| Ethyl alcohol | 156.5 |
| Sodium hydroxide (0.563 mole) | 22.5 |
| Water | 71.3 | and the stirrer started. The reaction mixture was heated at 40° for 3 hours, then heated at reflux about 80° C. for 2 hours. 60 milliliters of monochlorobenzene were then poured into the flask and the contents of the flask heated an additional three hours at reflux. The poly(hydroxyether) was recovered as a filter cake, dissolved in 280 ml. of dimethylformamide and the solution filtered. The filtered solution was poured into 1 liter of isopropanol with the result that the poly(hydroxyether) precipitated and coagulated. The poly(hydroxyether) was isolated by a filtration operation and acidified with 20 ml. of concentrated HCl (37%). The acid and the poly(hydroxyether) were thoroughly admixed by stirring at room temperature for 2 hours. The acid was removed by decantation from the poly(hydroxyether) and the poly(hydroxyether) washed with 3 portions of water, each portion being 1000 ml. The washed poly(hydroxyether) was dried in a vacuum oven (30 inches Hg vacuum) by heating for 48 hours at 65° C.

Properties of the poly(hydroxyether) produced:
Reduced viscosity=0.47.
Capillary melting point=200° C.
Melt index=0.05.
Stability index=−0.2.
Nature of the poly(hydroxyether)=white, powdery, amorphous solid.

A film having a thickness of 2 mils was prepared from the poly(hydroxyether) by dissolving the poly(hydroxyether) in sufficient dimethylformamide to form an organic solution containing 20 percent by weight solids and casting the solution onto a clean glass plate using a Boston Bradley No. 1340 draw down blade. The coated plate was heated for 24 hours at 60° C. under a pressure of 40 mm. (Hg) and then the film was stripped from the glass plate.

Properties (film).
Tensile strength (p.s.i.)=10,000.
Tensile modulus (p.s.i.)=320,000.
Glass transition temperature (° C.)=140.

Amount of sodium hydroxide used in conducting this example was 1.125 mole per mole of 4,4'-dihydroxydiphenylsulfone, amount of epichlorohydrin used was one mole per mole of 4,4'-dihydroxydiphenylsulfone; sodium hydroxide concentration was 0.26 molal.

Example 18

Into a 2 liter, three necked Morton flask, equipped with a sealed stirrer, thermometer, and reflux condenser there was placed:

| | Amount, grams |
|---|---|
| 2,2-bis-4,4'-dihydroxy - 3,3',5,5' - tetrachlorophenyl)-propane (1 mole) | 366.2 |
| Epichlorohydrin (1 mole) | 92.5 |
| Ethyl alcohol | 106.3 |
| Sodium hydroxide (1.1 moles) | 44 |
| Water | 139.3 | and the stirrer started. The reaction mixture was stirred at room temperature, about 25° C. for 64 hours. 40 grams (1 mole) of sodium hydroxide and 126.7 grams of water were then added into the flask and the contents of the flask heated to reflux, about 80° C. Monochlorobenzene was then added according to the following schedule:

After 90 minutes at reflux, 30 ml. of monochlorobenzene added; after 105 minutes at reflux, 30 ml. of monochlorobenzene added, and after 180 minutes at reflux, 30 ml. of monochlorobenzene added.

The resultant mixture was heated at reflux for an additional 3 hours. At the end of this period 9.4 grams (0.1 mole) of phenol and 60 ml. of monochlorobenzene were added into the flask and refluxing was continued for another two hours. The poly(hydroxyether) was separated from the aqueous layer and then washed, treated and recovered in a manner identical to that described in Example 1.

Properties of the poly(hydroxyether) produced:
Reduced viscosity=0.50.
Melt index=1.5.
Stability index=0.1.
Nature of the poly(hydroxyether)=white, amorphous powder.

A film, pressed from this product in a manner described in Example 1, had the following properties:
Properties (film).
Tensile strength (p.s.i.) 9600.
Tensile modulus (p.s.i.) 380,000.
Glass transition temperature (° C.)=105–115.

Amount of sodium hydroxide used in conducting this example was 2.1 moles per mole of the bisphenol, amount of epichlorohydrin used was 1 mole per mole of the bisphenol; sodium hydroxide concentration was 2.8 molal.

Example 19

Into a 2-liter, three-necked Morton flask, equipped with a sealed stirrer, thermometer and reflux condenser, there was placed:

| | Amount, grams |
|---|---|
| 2,2-bis-(p-hydroxyphenyl)-propane (0.5 mole) | 114.1 |
| 4,4'-dihydroxyl diphenyl sulfone (0.5 mole) | 125.1 |
| Epichlorohydrin | 92.5 |
| Ethyl alcohol | 212.6 |
| Sodium hydroxide (1.1 moles) | 44 |
| Water | 139.3 | and the stirrer started. The reaction mixture was heated at 40° C. for 3 hours, stirred at room temperature, about 25° C. for 16 hours, heated at reflux, about 80° C., for 30 minutes after which 60 ml. of monochlorobenzene were added. The reaction mixture was heated at reflux for an additional 90 minutes and then an additional 30 ml. of monochlorobenzene added. Refluxing was continued for an additional 5 hours. The aqueous layer was removed from the flask by decantation and 400 grams of chloroform were added into the flask with the result that the poly(hydroxyether) formed dissolved in the chloroform. The organic solution was acidified by adding thereto 40 ml. of conc. HLl (37%) and heating the acidified solution for one hour at 56° C. The poly(hydroxyether) was then washed, recovered and dried as described in Example 1.

Properties of the poly(hydroxyether) produced:
Reduced viscosity=0.49.
Melt index=0.1.
Stability index=0.1.
Nature of the poly(hydroxyether)=white, amorphous powder.

A film was prepared from the poly-hydroxyether) in a manner described in Example 1.
Properties (film).
Tensile strength (p.s.i.)=7840.
Tensile modulus (p.s.i.)=378,000.
Tensile elongation (%)=50–100.
Glass transition temperature (° C.)=75.

Amount of sodium hydroxide used in conducting this example was 1.1 moles per mole of dihydric phenols; amount of epichlorohydrin used was 1 mole per mole of dihydric phenols; sodium hydroxide concentration was 0.24 molal.

Example 20

Into a two-liter, three-necked Morton flask equipped with a sealed stirrer, thermometer and reflux condenser there was added:

| | Grams |
|---|---|
| 2,2-bis-(p-hydroxyphenyl)-propane (1 mole) | 228.3 |
| Epichlorohydrin (1 mole) | 92.5 |
| Ethyl alcohol | 212.6 |
| Sodium hydroxide (1 mole) | 40 |
| Water | 129 |

The mixture was stirred at 40° C. for 23 hours, then 4 gms. of sodium hydroxide in 13 gms. water were added and the mixture heated to reflux, (80° C.). Monochlorobenzene was then added according to the following schedule:

After 30 minutes at reflux, 60 ml. of monochlorobenzene added; after 45 minutes at reflux, 30 ml. monochlorobenzene added, and after 60 minutes at reflux, 30 ml. monochlorobenzene added.

The resultant mixture was heated at reflux for an additional 4 hours after which there was added 288 grams of chloroform and then 900 ml. of 4.1% by weight aqueous solution of HCl (37%). The aqueous layer was removed by decantation and the poly(hydroxyether) solution washed with an equal volume of water until the wash water was chloride free.

The poly(hydroxyether) was coagulated in 2 liters of isopropanol, recovered and dried in a manner described in Example 1.

Properties of the poly(hydroxyether) produced:
Reduced viscosity=0.53.
Melt index=1.0.
Stability=0.18.
Nature of the poly(hydroxyether)=white, amorphous powder.

Amount of sodium hydroxide used in conducting this example was 1.1 moles per mole of 2,2-bis-(p-hydroxyphenyl)propane; the amount of epichlorohydrin used was 1 mole per mole of 2,2-bis-(p-hydroxyphenyl)-propane; sodium hydroxide concentration was 0.27 molal.

Example 21

This example was conducted in a manner similar to that of Example 20 with the following exceptions:

(1) the amount of sodium hydroxide forming part of the initial charge in the Morton flask was 44 grams and no additional sodium hydroxide was added.

(2) the initial charge in the Morton flask was heated for 6½ hours at a temperature of about 39° C. to 45° C. with stirring, then allowed to stand at room temperature, about 25° C., for 16 hours without stirring and finally was heated at reflux (80° C.) for 5 hours.

Properties of the poly(hydroxyether) produced:
Reduced viscosity=0.60.
Melt index=0.4.
Stability index=0.10.
Nature of the poly(hydroxyether)=white, amorphous powder.

Amount of sodium hydroxide used in conducting this example was 1.1 moles per mole of 2,2-bis-(p-hydroxyphenyl)-propane; the amount of epichlorohydrin used was 1 mole per mole of 2,2-bis-(p-hydroxyphenyl)-propane; sodium hydroxide concentration was 0.27 molal.

*Example 22*

Into a two-liter, three-necked Morton flask equipped with a sealed stirrer, thermometer, and reflux condenser there was placed:

| | Grams |
|---|---|
| 2,2-bis-(p-hydroxyphenyl)-propane (1 mole) | 228.3 |
| Epichlorohydrin (1 mole) | 92.5 |
| Ethyl alcohol | 212 |
| Sodium hydroxide (1.1 moles) | 44 |
| Water | 139 | and the stirrer started. The reaction mixture was stirred at room temperature, about 25° C., for 16 hours and was thereafter heated at reflux about 80° C. for 5½ hours. Monochlorobenzene was then added according to the schedule described in Example 1. The aqueous layer was decanted from the poly(hydroxyether) solution after which there was added to the poly(hydroxyether) solution 900 ml. of a 4% by weight aqueous solution of hydrochloric acid (37%). The acidified solution was heated for 1 hour at 60° C., then coagulated in 2 liters of isopropanol, recovered and dried in a manner described in Example 1.

Properties of the poly(hydroxyether( produced:
Reduced viscosity=0.56.
Melt index=0.7.
Stability index=0.05.
Nature of the poly(hydroxyether)=white, amorphous powder.

A film was formed in a manner described in Example 1.
Properties (film).
Tensile strength (p.s.i.)=8800.
Tensile elongation (%)=85.
Tensile impact (ft.-lbs./inch$^3$)=137.

Amount of sodium hydroxide used in conducting this example was 1.1 moles per mole of 2,2-bis-(p-hydroxyphenyl)-propane; amount of epichlorohydrin used was 1 mole per mole of 2,2-bis(p-hydroxyphenyl)-propane; sodium hydroxide concentration was 0.27 molal.

Similarly an example conducted in a manner identical to Example 22 with the exception that epibromohydrin be used in lieu of epichlorohydrin will yield a poly-hydroxyether) having substantially the same properties as that of Example 22.

*Example 23*

A poly(hydroxyether) herein after referred to as poly(hydroxyether) herein after referred to as poly(hydroxyether A was prepared according to the method of the present invention and its properties determined and compared to the properties of the product prepared according to Example 18 of the Carpenter et al. Patent 2,602,075, hereinafter referred to as Control 1. The poly(hydroxyether) of this invention was prepared in the following manner: Into a 35-gallon stainless steel jacketed autoclave equipped with an anchor type agitator, temperature recording device, nitrogen inlet and reflux condenser, there was placed:

| | Amount, pounds |
|---|---|
| 2,2-bis(p-hydroxyphenyl)-propane | 40.0 |
| Epichlorohydrin | 16.28 |
| Ethyl alcohol | 37 |
| Sodium hydroxide | 7.85 |
| Water | 24.4 |

The mixture was reacted at 30° C. for 16 hours. At the end of this period, it was heated to reflux, about 80° C., and after 30 minutes at reflux, 23.2 lbs. of monochlorobenzene were added over a 30 minute interval. The reaction mixture was heated for an additional 4 hours at reflux. 1.65 lbs. of phenol and 10 lbs. of monochlorobenzene were added and the mixture refluxed for 2 hours. The mixture was cooled to 50° C., decanted, washed with 50 lbs. water, and 117 lbs. of chloroform were added which dissolved the poly(hydroxyether). 11.5 lbs. of phosphoric acid and 70 lbs. of water were then added and the mixture stirred at room temperature about 25° C. for two hours. The aqueous layer was decanted and the poly(hydroxyether) solution was washed with 40 lbs. portions of water until a negative silver nitrate test was obtained. Poly(hydroxyether)A was isolated by milling in a twin-screw vacuum mill at 250° C.

Properties of poly(hydroxyether)A:
Reduced viscosity=0.50.
Melt index=1.9.
Stability index=0.05.

Test bars were injection molded from poly(hydroxyether)A using a 2-ounce Van Dorn extruder under the following operating conditions:
Cylinder temperature=450° F.
Pressure=16,800 p.s.i.
Time of cycle=50 seconds.
Mold temperature=130° F.

Properties (molded bars).
Tensile modulus (p.s.i.)=371,000.
Tensile strength (p.s.i.)=8,800.
Tensile elongation (%)=62.
Tensile impact (ft. lbs./in.$^3$)=375.
Heat distortion temp. (° C.)=86.
Izod impact (ft. lbs./in.)=12.7.

A sample of poly(hydroxyether)A was applied as a film onto a clean glass plate according to the following procedure: A 10-gram sample of poly(hydroxyether)A was dissolved in 40 grams of dioxane and cast onto the glass plate using a Boston Bradley No. 1340 draw down blade. The coated glass plate was air dried at 25° C. for 2 hours then placed in a circulating air oven at 70° C. for 16 hours. The coated glass plate was then cooled to 25° C. and the film removed.

Properties (film).
Tensile modulus (p.s.i.)=300,000.
Tensile strength (p.s.i.)=9,000.
Tensile elongation (%)=100.
Glass transition temperature (° C.)=100.
Temperature at which tensile modulus=$10^4$ p.s.i.=98° C.

Amount of sodium hydroxide used in conducting this example was 1.1 moles per mole of 2,2-bis-(p-hydroxyphenyl)-propane; amount of epichlorohydrin used was 1.0 mole per mole of 2,2-bis-(p-hydroxyphenyl)-propane; the sodium hydroxide concentration was 0.27 molal.

Preparation of the poly(hydroxyether) hereinafter referred to as Control 1, was carried out according to Example 18 of the Carpenter et al. patent.

Into a two-liter, three-necked flask equipped with a sealed stirrer, thermometer, and reflux condenser there was placed:

| | Grams |
|---|---|
| 2,2-bis-(p-hydroxyphenyl)-propane (1.0 mole) | 228 |
| Epichlorohydrin (1.0 mole) | 92.5 |
| Alcohol | 240 |
| Sodium hydroxide (1.1 moles) | 44 |
| Water | 129 |

The mixture was heated under reflux, about 80° C. with stirring for 6 hours. It was then decanted, washed with hot distilled water, and dissolved in 426 gms. of chloroform. The poly(hydroxyether) solution was boiled with 0.5 N hydrochloric acid for ½ hour, deacnted, and then boiled several times with distilled water. The poly(hydroxyether) was coagulated in isopropanol, filtered, and dried in a vacuum oven.

Properties of Control 1.
Reduced viscosity=0.38.
Melt index=15.

Test bars were molded in a manner identical to that described for the test bars produced from poly(hydroxyether)A.

Properties (molded bars).
Tensile elongation (%)=9.
Tensile impact (ft. lbs./inch$^3$)=40.
Izod impact (ft. lbs./inch)=1.3.

A film was prepared using Control 1, in a manner described in Example 1.

Properties (film).
Tensile strength (p.s.i.)=7000.
Tensile elongation (%)=5.
Tensile impact (ft. lbs./inch$^3$)=30.

As indicated by the data above, the physical properties of the poly(hydroxyethers) of this invention are significantly better than the product produced according to the disclosure of Carpenter et al.

Example 24

This example was conducted in a manner identical to the preparation of poly(hydroxyether)A of Example 23 with the following exception:

(1) Toluene was used in place of monochlorobenzene.

Properties of the poly(hydroxyether) produced:
Reduced viscosity=0.56.
Melt index=0.75.
Stability index=0.09.

Molded bars were prepared in a manner described in Example 24 from the poly(hydroxyether) produced:

Properties (molded bars).
Tensile modulus (p.s.i.)=342,000.
Tensile strength (p.s.i.)=8,800.
Tensile elongation (%)=123.
Tensile impact (ft. lbs./inch$^3$)=356.
Heat distortion temperature (°C.)=84.
Izod impact (ft. lbs./inch)=22.4.

Amount of sodium hydroxide used in conducting this example was 1.1 moles per mole of 2,2-bis-(p-hydroxyphenyl)-propane; amount of epichlorohydrin used was 1.0 mole per mole of 2,2-bis-(p-hydroxyphenyl)-propane; sodium hydroxide concentration was 0.27 molal.

Example 25

This example was conducted in a manner described in Example 24 with the following exceptions:

(1) Amount of epichlorohydrin forming part of the initial charge in the autoclave was 16.36 lbs.

(2) HCl (37%) was used in place of phosphoric acid and once acidified the solution was heated at reflux for one hour.

Properties of the poly(hydroxyether) produced:
Reduced viscosity=0.68.
Melt index=0.2.
Stability index=0.

Molded bars were compression molded, using the poly(hydroxyether) produced under a pressure of 2,000 p.s.i. and at a temperature of 400° F.

Properties (molded bars).
Tensile modulus (p.s.i.)=417,000.
Tensile strength (p.s i.)=9,075.
Tensile elongation (%)=40.
Tensile impact (ft. lbs./inch$^3$)=420.
Heat distortion temperature (°C.)=87.

Amount of sodium hydroxide used in conducting this example was 1.1 moles per mole of 2,2-bis-(p-hydroxyphenyl)-propane; amount of epichlorohydrin used was 1.0 moles per mole of 2,2-bis-(p-hydroxyphenyl)-propane; sodium hydroxide concentration was 0.26 molal.

Example 26

Into a 350-gallon stainless steel jacketed autoclave equipped with an anchor type agitator, temperature recording device, nitrogen inlet, and a reflux condenser there was placed:

| | Pounds |
|---|---|
| 2,2-bis-(p-hydroxyphenyl)-propane | 300 |
| Epichlorohydrin | 122.22 |
| Ethyl alcohol | 277 |
| Sodium hydroxide | 57.8 |
| Water | 182.2 |

The mixture was reacted at a temperature of between 24° C. and 30° C. for 16 hours. At the end of this period, 0.5 lb. of phenol were added and the mixture heated to reflux, 82° C. After 30 minutes at reflux, 139 lbs. of chlorobenzene were metered into the reaction mixture over a 36-minute period. The reaction mixture was heated for an additional 3.9 hrs. at reflux. 11.36 lbs. of phenol in 108 lbs. of monochlorobenzene were added and the mixture further heated 2 hrs. at 81–82° C. (reflux). The mixture was cooled to 50° C. and 883 lbs. of chloroform added. Then, 29 lbs. of phosphoric acid (87%) and 300 lbs. of water were added and the mixture stirred at room temperature for two hours. The aqueous layer was decanted and the poly(hydroxyether) solution was alternately washed and decanted 6 times with 650 lb. portions of water. The pH of the final wash water was 5. The poly(hydroxyether) was isolated by first concentrating the solution by evaporating (continuously) in a 10-gallon bottom agitated heavy duty autoclave to 15% to 42% solids, and then removing the rest of the solvent in a 2″ twin screw vacuum mill at temperatures of 250° C. and finally stranding and dicing the devolatized product.

Properties of the poly(hydroxyether) produced:
Reduced viscosity=0.60.
Melt index=0.63.
Stability index=−0.1.

Nature of the poly(hydroxyether)=amber, free flowing, pellets having dimensions of ⅛″ x ¼″.

Molded bars were produced from the poly(hydroxyether) by injection molding using a 2-oz. Van Dorn extruder which was operated under the following conditions:

Cylinder temperature =400° F.–410° F.
Pressure=16,800 p.s.i.
Cycle=50 seconds.
Mold temperature=180° F.

Properties (molded bars).
Tensile strength (p.s.i.)=8,240.
Tensile modulus (p.s.i.)=361,000.
Tensile elongation (%)=74.
Tensile impact (ft.lbs./in.$^3$)=322.
Izod impact (ft.lbs./in.)=8.4.
Heat distortion (°C.)=83.

Amount of sodium hydroxide used in conducting this example was 1.1 moles per mole of 2,2-bis-to-(p-hydroxyphenyl)-propane; amount of epichlorohydrin used was 1 mole per mole of 2,2-bis-(p-hydroxyphenyl)-propane; sodium hydroxide concentration was 0.24 molal.

Example 27

This example was conducted in a manner identical to that of Example 26 with the following exception:

(1) After the initial charge in the autoclave was reacted for 16 hours at a temperature of between 24° C. and 30° C., there was added into the autoclave 0.67 lb. of phenol rather than 0.5 lb. phenol.

Properties of the poly(hydroxyether) produced:
Reduced viscosity=0.47.
Melt index=3.3.
Stability index=0.3.

Nature of the poly(hydroxyether)=diced, free flowing pellets having dimensions of ⅛″ x ¼″.

Amount of sodium hydroxide used in conducting this example was 1.1 moles per mole of 2,2-bis(p-hydroxyphenyl)-propane; amount of epichlorohydrin used was 1 mole per mole of 2,2-bis-(p-hydroxyphenyl)propane.

*Example 28*

Into a round-bottom flask equipped with a mechanical stirrer, condenser and a thermometer, there was placed 148.2 grams (0.50 mole) of bisphenol of vinylcyclohexene 46.3 gms. of epichlorohydrin and 106.8 gms. of ethyl alcohol. After the mixture had been stirred for 15 minutes, 22.0 gms. (0.55) of sodium hydroxide dissolved in 69.7 gms. of water were added into the flask. Thirty minutes after the addition of the epichlorohydrin, the reaction mixture was heated to reflux, about 80° C. During a 5 hour period at 80° C., a total of 100 milliliters of monochlorobenzene were added into the flask in portions sufficient to keep the mixture stirrable. A solution of 4.7 gms. (0.05 mole) of phenol in 20 milliliters of monochlorobenzene was then introduced into the flask and reflux continued for one hour. The water layer was decanted from the contents of the flask and the organic layer in the flask, which contained the poly(hydroxyether), was diluted with 200 milliliters of dichloromethane. The mixture was neutralized by the addition of 10 grams of phosphoric acid in 200 milliliters of water. After the two-phase mixture which resulted, had been stirred for one hour, the water layer which contained salt and acid was decanted. The organic layer was washed repeatedly with water until free of chloride and phosphate ions. The organic layer was poured in 2 liters of isopropanol with the result that the poly(hydroxyether) coagulated.

The poly(hydroxyether) was dried as described in Example 1.
Properties of the poly(hydroxyether):
Reduced viscosity=0.45.
Melt index=2.5.
Stability index=0.
Nature of the poly(hydroxyether)=white, amorphous powder.

A film was prepared from the poly(hydroxyether) according to the procedure described in Example 1.
Properties (film).
Tensile strength (p.s.i.)=7,500.
Tensile modulus (p.s.i.)=242,000.
Tensile elongation (%)=65.
Glass transition temperature (° C.)=135–140.
Heat distortion temperature (° C.)=115.

Amount of sodium hydroxide used in conducting this example was 1.1 mole per mole of the dihydric polynuclear phenol; amount of epichlorohydrin used was 1.0 mole per mole of the dihydric polynuclear phenol; sodium hydroxide concentration was 0.27 molal.

This bisphenol of vinyl cyclohexane used in this example has the formula:

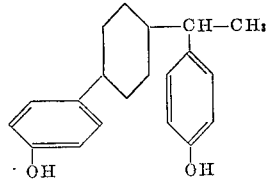

and was prepared as follows: Into a 2-liter flask equipped with a stirrer, thermometer, dropping funnel and reflux condenser, there was placed 1000 grams of phenol, 3 grams of boric acid and 6 grams of oxalic acid. The mixture was heated at 90° C., with stirring, until a clear solution was effected. 108 grams of 4-vinylcyclohexene were added dropwise into the flask through the dropping funnel over a 1 hour period while the contents of the flask were being stirred. The contents of the flask were then heated at a temperature of between 90° C.–100° C. with constant stirring for 4 hours. The reaction mixture was then distilled at 5–6 mm. Hg pressure to a final residue temperature of 190° C. yielding 105 grams of a redish brown residue. The residue was then twice recrystallized from toluene and 11 grams of white crystals recovered. The white crystals had a capillary melting point of 183° C.–184° C. The crystalline product, when analyzed by means of reversed phase filter paper chromatography showed a single band with an $R_f$ value of 0.10. This value is consistent with the formula noted previously for the bisphenol.

The amount of sodium hydroxide, the amount of epichlorohydrin and the molal concentration of sodium hydroxide in Examples 29, 30, 31 and 32 which follow were the same as in Example 28.

*Example 29*

This example was conducted in a manner identical to that described in Example 28 with the following exceptions:
(1) 136.0 grams of ethyl alcohol were used instead of 106.8 grams.
(2) The reaction mixture was heated at reflux for five and three-quarter hours instead of 5 hrs. and 120 milliliters of chlorobenzene were used instead of 100 milliliters.
Properties of the poly(hydroxyether) produced:
Reduced viscosity=0.49.
Melt index=1.8.
Stability index=0.
Nature of the poly(hydroxyether)=white, amorphous powder.

Conducting an example in a manner identical to that of Example 29 with the exception that 1,2-epoxy-1-methyl-3-chloropropane be used in lieu of epichlorohydrin will result in a poly(hydroxyether) having substantially the same properties as those of the product of Example 29.

*Example 30*

This example was conducted in a manner identical to that described in Example 28 with the following exceptions:
(1) 57.0 grams (0.25 mole) of 2,2-bis-(p-hydroxyphenyl)propane and 74.1 grams (0.25 mole) of bisphenol of vinylcyclohexene were used instead of 148.2 grams (0.50 mole) of bisphenol of vinylcyclohexene.
(2) The reaction mixture was heated at reflux for 5 hours instead of 5 and three quarter hours.
Properties of poly(hydroxyether) produced:
Reduced viscosity=0.54.
Melt index=0.35.
Stability index=0.
Nature of the poly(hydroxyether)=white, amorphous powder.

Infrared analysis of the poly(hydroxyether) showed that the product contained 55 percent by weight of the bisphenol of vinylcyclohexene.

A film was prepared from the poly(hydroxyether) in a manner described in Example 1.
Properties (film).
Tensile strength (p.s.i.)=6300.
Tensile modulus (p.s.i.)=270,000.
Tensile elongation (%)=35.
Glass transition temperature (° C.)=95–100.

*Example 31*

This example was conducted in a manner identical to that described in Example 28 with the exception that the bisphenol of vinylcyclohexene was replaced by an equimolar amount of 2,2-bis-(3,5-dichloro-4-hydroxyphenyl)propane.
Properties of the poly(hydroxyether).
Reduced viscosity=0.54.
Melt index=1.1.
Stability index=0.1.
Nature of the poly(hydroxyether)=white, amorphous powder.

Example 32

This example was conducted in a manner described in Example 28, with, however, the following exception:

(1) The bisphenol of vinylcyclohexene was replaced by a molar equivalent of 1,1-bis-(4-hydroxyphenyl)-2-phenyl ethane.

Properties of the poly(hydroxyether) produced:
Melt index=1.9.
Stability index=0.
Nature of the poly(hydroxyether)=white, amorphous powder.

A film was prepared from the poly(hydroxyether) in a manner described in Example 28.

Properties (film).
Tensile strength (p.s.i.)=8500.
Tensile modulus (p.s.i.)=340,000.
Glass transition temperature (° C.)=105–115° C.

Example 33

In order to further indicate that the poly(hydroxyethers) of the present invention have significantly better properties than the product produced according to Example 18 of Carpenter et al., poly(hydroxyethers) produced according to this invention and the product produced according to Example 18 of Carpenter et al. were tested at 25° C. and at 60° C. for tensile modulus (film) and tensile strength (film). The data below clearly shows that the poly(hydroxyethers) of this invention have a significantly high retention of physical properties whereas the product of Carpenter et al. does not.

| Poly(Hydroxyether) | Tensile Strength | | Percent Retention |
|---|---|---|---|
| | 25° C. | 60° C. | |
| Carpenter et al. (Example 18) | 7,600 | 1,800 | 25 |
| Poly(hydroxyether) of Example 10 | 6,400 | 4,600 | 72 |
| Poly(hydroxyether) of Example 11 | 7,200 | 5,000 | 69 |

Example 34

This example was conducted in a manner identical to that described in Example 28 with the following exceptions:

(1) 148.6 Grams (0.5 mole) of 2,2-bis-(3-chloro-4-hydroxyphenyl)-propane was used in lieu of bisphenol of vinylcyclohexene.

(2) The reaction mixture was heated at reflux for 7 hours instead of 5¾ hours.

Properties of the poly(hydroxyether) produced:
Reduced viscosity=0.43.
Melt index=3.7.
Stability index=0.
Nature of the poly(hydroxyether)=white, amorphous powder.

A film was prepared from the poly(hydroxyether) according to the procedure described in Example 1.

Properties (film).
Tensile strength (p.s.i.)=6,100.
Tensile modulus (p.s.i.)=310,000.
Glass transition temperature (° C.)=85–90.
Temperature at which tensile modulus=$10^4$ p.s.i. =87° C.

Amount of sodium hydroxide used in conducting this example was 1.1 mole per mole of the dihydric polynuclear phenol; amount of epichlorohydrin used was 1.0 mole per mole of the dihydric polynuclear phenol; sodium hydroxide concentration was 0.27 molal.

The poly(hydroxyethers) of the present invention, as shown have excellent mechanical properties making such materials desirable for use in a wide variety of applications. For example, their excellent thermal stability, as manifested by "stability index" allows them to be extruded or otherwise shaped by thermo-forming techniques into a multitude of objects such as film, rods, tubing and the like without degradation or without advancing to an unworkable state. The excellent tensile impact strength of the poly(hydroxyethers) provides articles produced therefrom with excellent resistivity to impact, bending and other such rough usage.

If desired, film produced from the poly(hydroxyethers) can be biaxially stretched at appropriate temperatures, to effect an orientation of the molecules thereof thus further improving its mechanical properties, as is well known in the art.

In addition to the production of film material and molded articles, the poly(hydroxyethers) can be used as coatings on such material as aluminum foil, polyethylene, magnetic tapes and the like as well as used to form laminated structures.

What is claimed is:

1. A thermoplastic poly(hydroxyether), characterized by the absence of epoxy groups, having: a reduced viscosity of at least 0.43, measured at 25° C. in tetrahydrofuran at a concentration of 0.2 gram per 100 ml. of solution; a melt index at 220° C. of less than about 5 decigrams per minute under a pressure of 44 p.s.i.; a stability index of less than about a 20 percent change; and a tensile impact strength of greater than about 75 ft.lbs./inch³ and consisting essentially of recurring units of the formula:

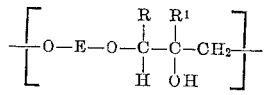

wherein R and R¹ are hydrogen or methyl and —O—E—O— is the residue obtained by removing the hydroxyl hydrogen atoms of a dihydric polynuclear phenol which has the formula:

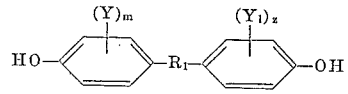

wherein each individual Y and each individual $Y_1$ is selected from the group consisting of alkyl containing from 1 to 4 carbon atoms inclusive, alkoxy containing from 1 to 4 carbon atoms inclusive and halogen, $m$ and $z$ are integers each having a value of 0 to 4 inclusive and $R_1$ is selected from the group consisting of an alkylene radical having a maximum of 16 carbon atoms, an alkylidene radical having a maximum of 8 carbon atoms, a cycloaliphatic radical having a maximum of 12 carbon atoms,

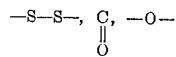

and, a valence bond; and mixtures thereof.

2. A thermoplastic poly(hydroxyether) as defined in claim 1 wherein said poly(hydroxyether) has a reduced viscosity of from 0.43 to about 1.

3. A thermoplastic poly(hydroxyether) as defined in claim 1 wherein the dihydric polynuclear phenol is 4,4'-dihydroxydiphenyl sulfone.

4. A self-sustaining film produced from the poly(hydroxyether) defined in claim 1.

5. A thermoplastic poly(hydroxyether) as defined in claim 1 wherein the dihydric polynuclear phenol is a bis-(hydroxyphenyl)alkane.

6. A thermoplastic poly(hydroxyether) as defined in claim 1 having: a reduced viscosity of from about 0.5 to about 0.7; a melt index at 220° C. of from about 0.1 to about 4 decigrams per minute under a pressure of 44 p.s.i.; a stability index of less than about a 10 percent change; and a tensile impact strength of greater than about 75 ft.lbs./inch³.

7. A thermoplastic poly(hydroxyether) as defined in claim 1 wherein the dihydric polynuclear phenol is a mixture of 2,2-bis(hydroxyphenyl)propane and 4,4'-dihydroxydiphenyl sulfone.

8. A thermoplastic poly(hydroxyether) as defined in claim 1 wherein the dihydric polynuclear phenol is 2,2-bis(phydroxyphenyl)-propane.

9. A thermoplastic poly(hydroxyether) as defined in claim 1 wherein the dihydric polynuclear phenol is the bisphenol of vinylcyclohexene.

10. Process for the preparation of thermoplastic poly(hydroxyethers) which comprises admixing, in an aqueous medium, a dihydric polynuclear phenol in which the hydroxyl groups are attached to different nuclei, from about 0.985 to about 1.015 moles of an epihalohydrin per mole of said phenol and from about 0.6 to about 1.5 moles of an alkali metal hydroxide per mole of said phenol, at a temperature of about 10° C. to about 50° C. until about 60 mole percent of said epihalohydrin has been consumed, raising the temperature of the mixture to a range of from about 60° C. to reflux and heating the mixture at a temperature within said range until a poly(hydroxyether) is produced which has a reduced viscosity of at least 0.43, measured at 25° C. in tetrahydrofuran at a concentration of 0.2 gram per 100 ml. of solution, during which time the amount of alkali metal hydroxide in the mixture is maintained at a level such that the concentration of said alkali metal hydroxide in the aqueous layer of the reacted mixture is at least about 0.1 molal and recovering said poly(hydroxyether).

11. Process as defined in claim 10 wherein the dihydric polynuclear phenol has the formula:

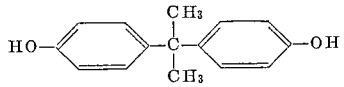

12. Process as defined in claim 10 wherein the mixture is at a temperature of about 20° C. to about 40° C. until about 60 mole percent of said epihalohydrin has been consumed.

13. Process as defined in claim 10 wherein said alkali metal hydroxide is selected from the group consisting of sodium hydroxide and potassium hydroxide.

14. Process as defined in claim 10 wherein the amount of materials used is about 0.985 mole of an epihalohydrin per mole of said phenol and about 1.25 moles of an alkali metal hydroxide per mole of said phenol.

15. Process as defined in claim 10 wherein the dihydric polynuclear phenol has the formula:

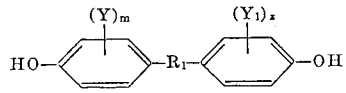

wherein each individual Y and each individual $Y_1$ is selected from the group consisting of alkyl containing from 1 to 4 carbon atoms inclusive, alkoxy containing from 1 to 4 carbon atoms inclusive and halogen, $m$ and $z$ are integers each having a value of 0 to 4 inclusive and $R_1$ is selected from the group consisting of an alkylene radical having a maximum of 16 carbon atoms, an alkylidene radical having a maximum of 8 carbon atoms, a cycloaliphatic radical having a maximum of 12 carbon atoms, $$-SO_2-,\quad -S-S-,\quad -S-,\quad \overset{O}{\underset{\|}{C}},\quad -O-$$

a valence bond; and mixtures thereof and the epihalohydrin has the formula:

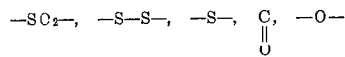

wherein R and $R^1$ are selected from the group consisting of hydrogen and methyl and X is a halogen atom.

References Cited by the Examiner

UNITED STATES PATENTS

| | | | |
|---|---|---|---|
| 2,456,408 | 12/1948 | Greenlee | 260—47 |
| 2,694,694 | 11/1954 | Greenlee | 260—47 |
| 2,767,157 | 10/1956 | Masters | 260—47 |
| 2,811,564 | 10/1957 | Bader | 260—619 |
| 2,824,855 | 2/1958 | Freeman et al. | 260—47 |
| 2,854,461 | 9/1958 | De Groote et al. | 260—348 |
| 2,943,096 | 6/1960 | Reinking | 260—47 |

FOREIGN PATENTS

| | | |
|---|---|---|
| 516,921 | 9/1955 | Canada. |
| 681,578 | 10/1952 | Great Britain. |

OTHER REFERENCES

Lee et al.: "Epoxy Resins," pp. 14 and 15 relied on, McGraw-Hill Book Co., Inc., N.Y., 1957 (copy in Scientific Library).

Mark and Tobolsky: "Physical Chemistry of High Polymeric Systems," vol. II, 2nd ed., 1950 Interscience Publishers, Inc. (pp. 285 and 287 relied on).

WILLIAM H. SHORT, *Primary Examiner.*

H. N. BERNSTEIN, *Examiner.*

A. LIBERMAN, T. D. KERWIN, *Assistant Examiners.*